United States Patent
Hillier et al.

(10) Patent No.: US 8,712,388 B2
(45) Date of Patent: Apr. 29, 2014

(54) AUTOMATIC POPULATION OF FEATURE CAPABILITIES ON A COMMUNICATION DEVICE

(75) Inventors: Peter Matthew Hillier, Ottawa (CA); Curtis Spencer, Ottawa (CA)

(73) Assignee: Mitel Networks Corporation, Ottawa, Ontario (CA)

( * ) Notice: Subject to any disclaimer, the term of this patent is extended or adjusted under 35 U.S.C. 154(b) by 63 days.

(21) Appl. No.: 12/925,917

(22) Filed: Nov. 1, 2010

(65) Prior Publication Data

US 2012/0106726 A1     May 3, 2012

(51) Int. Cl.
*H04M 3/42*     (2006.01)

(52) U.S. Cl.
USPC .................................. 455/414.1; 379/201.12

(58) Field of Classification Search
USPC ....................................................... 455/414.1
See application file for complete search history.

(56) References Cited

U.S. PATENT DOCUMENTS

| | | | |
|---|---|---|---|
| 6,029,065 A * | 2/2000 | Shah | 455/414.4 |
| 2007/0127451 A1 | 6/2007 | Jung et al. | |
| 2008/0137646 A1 * | 6/2008 | Agarwal et al. | 370/352 |
| 2010/0039993 A1 * | 2/2010 | Ramankutty et al. | 370/328 |
| 2012/0032889 A1 * | 2/2012 | Griffin et al. | 345/169 |

* cited by examiner

*Primary Examiner* — Creighton Smith (57) ABSTRACT

A communication device, system and service provider for automatically populating feature capabilities. In one illustrative embodiment, the communication device can begin automatic download of service provider features and content by registering with a service provider. When successfully registered, the service provider can determine a set of available features for the communication device. The available features can be dependent on a number of factors including licensing, location, or subscription of the communication device. Available features can also be dependent on whether the communication device is idle or active. The service provider can notify the communication device with the set of available features. The features can be uniquely identified by a feature identification that represents the service provider and the feature. At any time, when the communication device reports that the user has selected a feature on the device, the service provider can take the appropriate actions.

20 Claims, 5 Drawing Sheets

302 — SUBSCRIBE sip:MyName@MyServiceProvider.com SIP/2.0
Via: SIP/2.0/UDP ual.example.com;branch=sdfgjklhdfkghsdr9t834
From: <sip:MyName@MyServiceProvider.com>;tag=242345-wert234
To: <sip:MyName@MyServiceProvider.com>
CSeq: 1 SUBSCRIBE
Call-ID: werF732-gfyr34ser-23ed53
Contact: <sip :MyName@MyAddress.com>
304 — Event: feature_available;feature_active
Accept: application/dialog-info+xml
Max-Forwards: 70
Expires: 3600
Content-Length: 0

FIG. 3

```
402 ─┬─NOTIFY sip:sip:MyName@MyAddresss.com SIP/2.0
     │ From: <sip:MyName@MyServiceProvider.com>;tag=32453245325
     │ To: <sip:MyName@MyServiceProvider.com>;tag=242345-wert234
     │ Call-ID: werF732-gyyr34ser-23ed53
     │ CSeq: 312 NOTIFY
     │ Via: SIP/2.0/UDP featureagent.MyServiceProvider.com;branch=z9hG4bK1846
     │ Max-Forwards: 70
     │ Content-Type: application/feature-info+xml
404 ─┼─Event: feature_available;feature_active
     │ Subscription-State: active
     │ Contact: <featureagent.MyServiceProvider.com>
     │ Content-Length: ...
     │   <?xml version="1.0"?>
     │   <Feature_avalible>─ 408
     │       <feature>─ 412
     │           <feature-id> CFA </feature-id>─ 416
     │           <feature-data> 1 </feature-data>─ 418
     │           <feature-label> "Call Forward Always" </feature-label>─ 420
     │           <feature-menu> idle </feature-menu>─ 422
     │           <feature-state> off </feature-state>─ 424
     │       </feature>─ 414
     │       <feature>─ 412
     │           <feature-id> DND </feature-id>─ 416
     │           <feature-data> 0 </feature-data>─ 418
406 ─┤           <feature-label> "Do Not Disturb" </feature-label>─ 420
     │           <feature-menu> idle </feature-menu>─ 422
     │           <feature-state> on </feature-state>─ 424
     │       </feature>─ 414
     │       <feature>─ 412
     │           <feature-id> CPrk </feature-id>─ 416
     │           <feature-data> 1 </feature-data>─ 418
     │           <feature-label> "Call Park" </feature-label>─ 420
     │           <feature-menu> active </feature-menu>─ 422
     │           <feature-state> off </feature-state>─ 424
     │       </feature>─ 414
     │   </feature_available>─ 410
```

AUTOMATIC POPULATION OF FEATURE CAPABILITIES ON A COMMUNICATION DEVICE

TECHNICAL FIELD

This application generally relates to communication devices, and more particularly, to downloading available service provider features and content to a particular communication device.

BACKGROUND

The communications market is moving en mass to open standards, be it communication protocols, application frameworks, or industry standard hardware platforms. This is designed to facilitate mass deployment and interoperability, essentially providing freedom to market and deployment of devices and/or software that will work with any service providers, any applications, and/or any hardware. Through these open standards, the days of designing a proprietary product to work specifically with a single service provider, i.e. a device/service provider partnership, are dwindling.

As an example of this, it has become common place to deploy third party devices as part of end-to-end communication solutions. These devices use open standard based protocols to communicate with a private branch exchange platform to obtain call services. Unfortunately, much of the service provider private branch exchange functionality is "lost", as the ability to control the device is limited, and therefore providing feature rich services, including basics such as transfer or conference, is difficult. Moreover, in an effort to attract more customers, service providers are offering more and more feature rich calling abilities, but these are not always known or accessible by the device, effectively limiting its usefulness.

There are two solutions available today that would allow the device user to access the available features from the service provider. The first requires the use of a feature access code entered from the keypad. The use of DTMF codes to invoke features is rather old fashioned and places the burden on the user to remember these codes. Given that the codes can change from provider to provider, the user must also know which network they are on at any given time. They also need to know in what situation each code is valid. The second solution was created by device manufacturers to allow service providers to tailor the device to their network. This involves tools that can be used to modify device menus within the device software to match the features available in the service provider network. These menus can just encapsulate the DTMF feature access codes or communicate out-of-band to signal the feature to the service provider. While this does serve to abstract the user from having to remember code, changes to these access codes, including additions and deletions of features, requires rework to all devices on the network. This solution allows the device manufacture to more easily inter-operate with multiple service providers provided they support the same feature set. If there are differences the device manufacturer modifies the menus resulting in creating a look, feel, and behavior specific to only one provider, and hence the phone becomes "locked" to that provider, and is not usable on other provider networks.

Many of the solutions that offer such configuration tools to modify or create menu templates only provide for inserting the feature access codes as speed dials. This limits the ability to enter random information, for example, call forwarding, which requires a directory number afterwards that cannot be known at the time the menu template is created. Some interfaces have advanced over time to offer an input selection, but this is by no means standard.

When a user of a mobile device is considered, they can access, or have the opportunity to access, several different networks each day (PSTN/mobile, Internet/Intranet), and using a variety of transmission mediums (cellular, WiFi, Bluetooth). The features available on these networks can vary, or be offered simultaneously, but the users' menus are static and designed specifically with a single provider in mind. A need therefore exists for a system and method that allows features and content to be dynamically downloaded to a device using open communication protocols. The present application addresses the above-described concerns encountered in a device/server relationship and provides other, related advantages.

BRIEF DESCRIPTION OF DRAWINGS

The novel features believed to be characteristic of the application are set forth in the appended claims. In the descriptions that follow, like parts are marked throughout the specification and drawings with the same numerals, respectively. The drawing figures are not necessarily drawn to scale and certain figures can be shown in exaggerated or generalized form in the interest of clarity and conciseness. The application itself, however, as well as a preferred mode of use, further objectives and advantages thereof, will be best understood by reference to the following detailed description of illustrative embodiments when read in conjunction with the accompanying drawings, wherein:

FIG. 4 is representative code depicting available features for the communication device provided by the service provider in the form of a notification message in accordance with one aspect of the present application.

DESCRIPTION OF THE APPLICATION

The description set forth below in connection with the appended drawings is intended as a description of presently-preferred embodiments of the application and is not intended to represent the only forms in which the present application can be constructed and/or utilized. The description sets forth the functions and the sequence of steps for constructing and operating the application in connection with the illustrated embodiments. It is to be understood, however, that the same or equivalent functions and sequences can be accomplished by different embodiments that are also intended to be encompassed within the spirit and scope of this application.

Generally described, the present application relates to communication devices, and more particularly, to automatically populating feature capabilities on those communication devices. In one illustrative embodiment, the communication device can begin automatic download of service provider features and content by registering with a service provider. When successfully registered, the service provider can determine a set of available features for the communication device. The available features can be dependent on a number of factors including licensing, location, or subscription of the communication device. Available features can also be dependent on whether the communication device is idle or active. The service provider can then provide the communication device with the set of available features. The features can be uniquely identified by a feature identification that represents the service provider and the feature. At any time, when the communication device reports that the user has selected a feature on the device, the service provider can take the appropriate actions.

Numerous advantages can be provided through the communication device/service provider combination described above. The combination can eliminate provisioning overhead as well as provide flexible changes for features and feature requirements, for example, input. It can be extended to offer features based on location, licensing, or other conditions as determined by the centralized service provider. While the term "communication device" is referred to throughout the present application, the handset can take on other names known to those skilled in the relevant art. For example, the communication device can also be referred to as a computing device or mobile device.

Variations to the provided illustrative embodiment are described herein and will become apparent to one skilled in the relevant art. Below, an exemplary operating environment for downloading features and content from a service provider to a communication provider will be described first. Thereafter, a flow chart showing illustrative processes for populating features within the communication device will be described along with bits of sample code.

Figure 1:
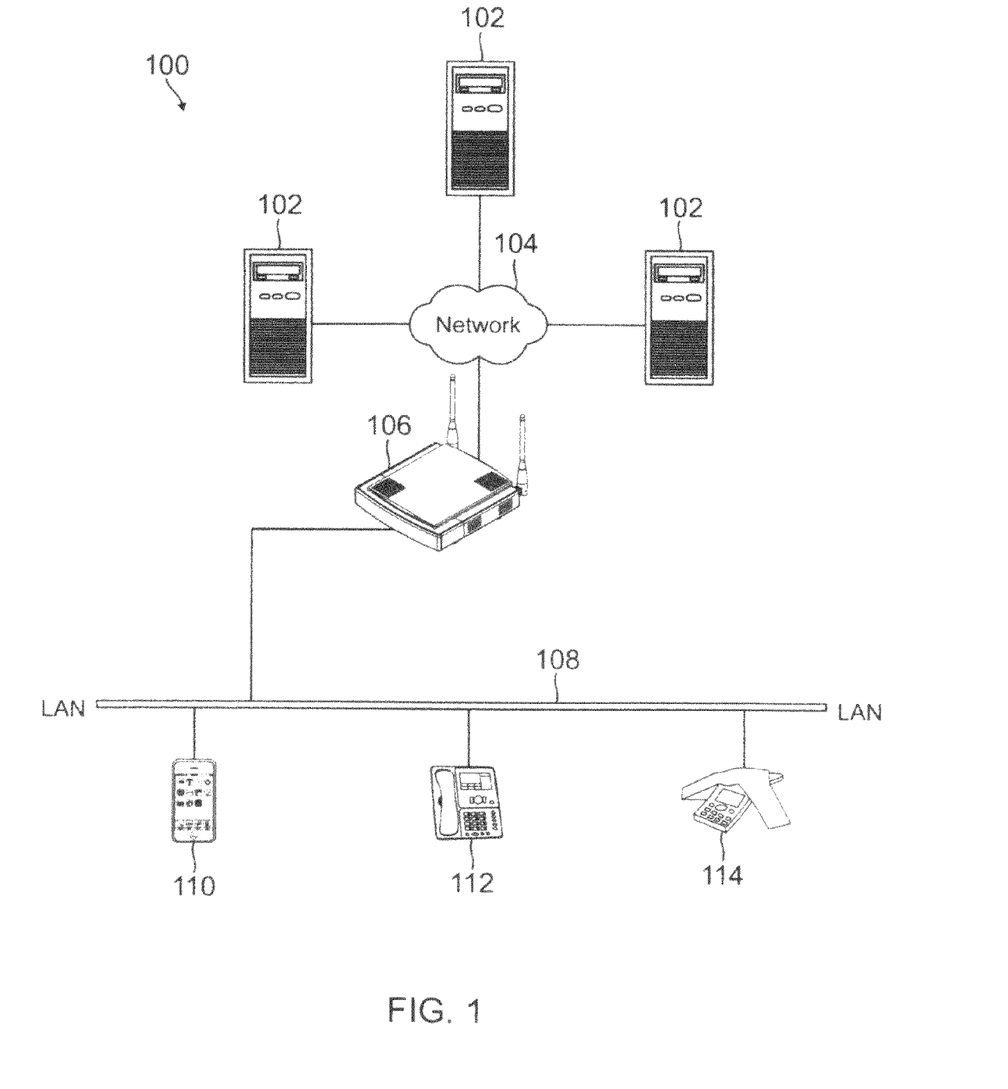
FIG. 1 is a typical system for providing feature capabilities in accordance with one aspect of the present application.

Turning to FIG. 1, a typical system 100 for providing feature capabilities in accordance with one aspect of the present application is provided. The system 100 can include at least one service provider 102, network 104, router 106, local area network (LAN) 108, communication device 110, IP phone 112, and conference phone 114 configuration as shown. These components should not be construed as limiting the scope of the present application, but instead, the components and the system 100 should be viewed as only one embodiment that can be used.

Components within the system 100 can communicate with each other using logical connections. These logical connections can be achieved by a communication portal coupled to or integral with each component of the system 100. The service provider 102 of the system 100 can be provided on a private branch exchange (PBX). PBXs 102 can be used for providing numerous features and capabilities to connected devices. Known in the relevant art, PBXs 102 can provide features such as auto attendant, auto dialing, automatic call distributor, automated directory services, automatic ring back, call accounting, call blocking, call forwarding on busy or absence, call park, call pick-up, call transfer, call waiting, camp-on, conference call, custom greetings, customized abbreviated dialing, busy override, direct inward dialing, direct inward system access, do not disturb, follow-me/find-me, interactive voice response, music on hold, night service, public address voice paging, shared message boxes, voice mail, voice message broadcasting, and welcome message. These features can come in two categories common to most devices today. The vast majority of devices have an in-call menu and out-of-call menu. These menus can contain the features available during that particular call state. As an example, the out-of-call menu can contain Contacts, Speed Dial, Call Forward, Call Pickup, and Do Not Disturb. An example of in-call menu options would be Transfer, Swap, New Call, Hold, Call Park, and Record Call.

A single service provider 102 within the system 100 can be used to distribute features and content to the communication device 110. In one embodiment, the system 100 can incorporate two or more service providers 102. The service providers 102 can be logically connected to a network 104. The network 104 can include a local area network (LAN), wide area network (WAN), personal area network (PAN), campus area network (CAN), metropolitan area network (MAN), or global area network (GAN). Such networking environments are commonplace in office networks, enterprise-wide computer networks, intranets and the Internet, which are all types of networks.

The network 104 can be a group of two or more computer systems linked together. The network 104 typically transfers data from one source to another. To communicate efficiently, service provider 102 and communication devices 110 connected via the network 104 can use a common set of rules and signals, also known as a protocol. Generally, the protocol determines the type of error checking to be used; what data compression method, if any, will be used; how the sending device will indicate that it has finished sending a message; and how the receiving device will indicate that it has received a message. Programmers can choose from a variety of standard protocols. Existing electronic commerce systems typically use Internet Protocol (IP) usually combined with a higher-level protocol called Transmission Control Protocol (TCP), which establishes a virtual connection between a destination and a source. IP is analogous to a postal system in that it allows the addressing of a package and dropping it in the system without a direct link between the sender and the recipient. TCP/IP, on the other hand, establishes a connection between two hosts so that they can send messages back and forth for a period of time. In the present application, an open communication protocol can be used, such as a session initiation protocol (SIP).

Continuing with FIG. 1 and the components therein, a router 106 can be coupled to the network 104. The router 106 can receive communications from both the service provider 102 and the communication device 110. In one embodiment, the communications can be provided to a LAN 108. The LAN 108 can connect multiple devices to the service providers 102. Typically, LANs 108 can be made by a combination of computers and devices within a limited geographical area.

While a communication device 110 was described above, the system 100 can also be used with other devices such as IP phones 112 and conference phones 114 that can be connected through a LAN 108 to the router 106 and to the network 104. The IP phones 112 and conference phones 114 can use the same open communications protocol described above and be connected with the communication device 110 through the LAN 108. Known to those skilled in the relevant art, the embodiment provided above represents one configuration and is not intended to be limiting to the present application.

For purposes of illustration, a flow chart will now be provided showing operations for populating features and content on a communication device 110. This flow chart is given so that a general understanding of this application can be appreciated by those skilled in the relevant art. It should not be construed as limiting to the present application. The flow chart begins with retrieving and displaying available features followed by applying selections for a feature within the available features.

Figure 2A:
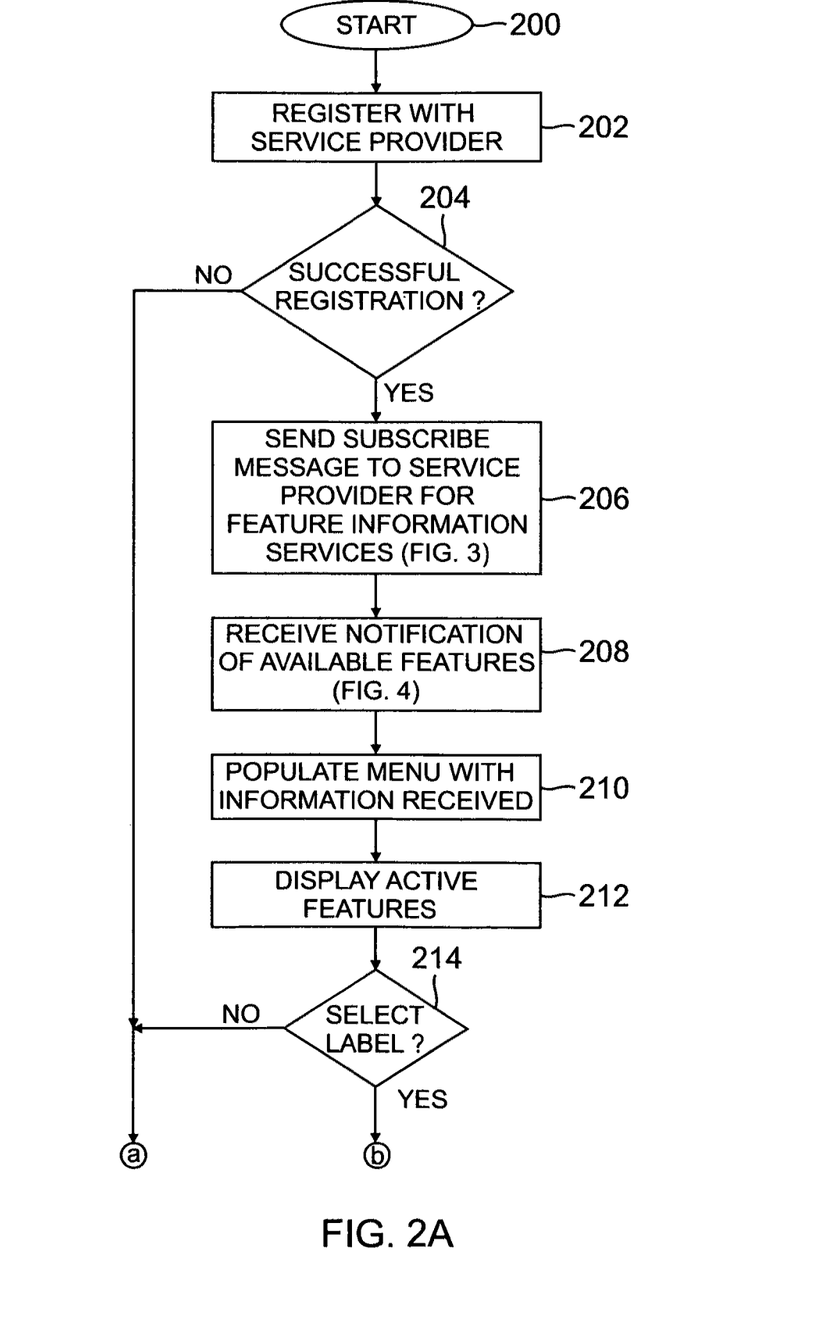
FIGS. 2A-2B are flow charts providing illustrative processes for populating a communication device with features in accordance with one aspect of the present application.
Figure 2B:
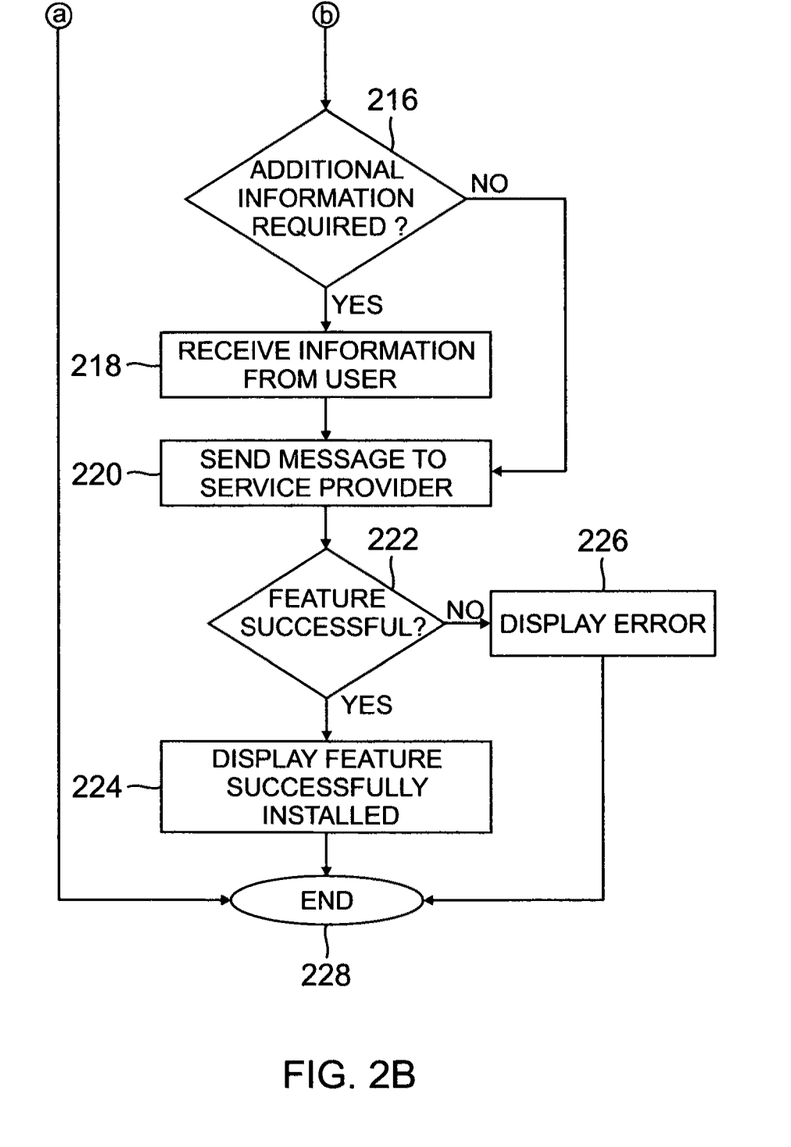

FIGS. 2A-2B represent a flow chart providing illustrative processes for populating a communication device 110 with features in accordance with one aspect of the present application. The system 100 creates a framework that can be extensible and be offered by numerous service providers 102 to any device 110 supporting the protocol, allowing for pay per use services, incentives, and other means of revenue generation, without actually being the primary provider of the communication device 110. Because of the client/server relationship utilized by this system 100 it can be applied in traditional client/server protocols as well as peer-based protocols such as SIP.

At block 200 of FIG. 2A, the processes can begin for automatically populating feature capabilities on a communication device 110. The description provided below will consider the SIP communication protocol in order to provide a minimal set of detailed interactions. Known to those skilled in the relevant art, however, numerous other types of protocols exist and can be used herein. The exchange method is of little consequence, except that SIP has been selected for purposes of providing a standard look and feel, and it uses open text for ease of readability.

An actual deployed solution can take a client/server application based approach, with the client and server software being offered as a combined solution. At block 202, the communication device 110 can register with a service provider 102. In one embodiment, the user of the communication device 110 can provide account information. Known to those skilled in the relevant art, there are numerous methods for registering a communication device 110. Typically, block 202 can be skipped if the communication device 110 has already been registered.

The service provider 102 can use a look-up service to determine whether the communication device 110 is capable of receiving the services provided by the service provider 102. If the registration was successful, the service provider 102 can send an indication to the communication device 110, otherwise an error can be sent to the communication device 110. At decision block 204, a determination on the communication device 110 can be made whether the registration of the communication device 110 was successful using the information provided by the service provider 102. When the registration was not successful, the processes can end at block 228 on FIG. 2B.

Figure 3:
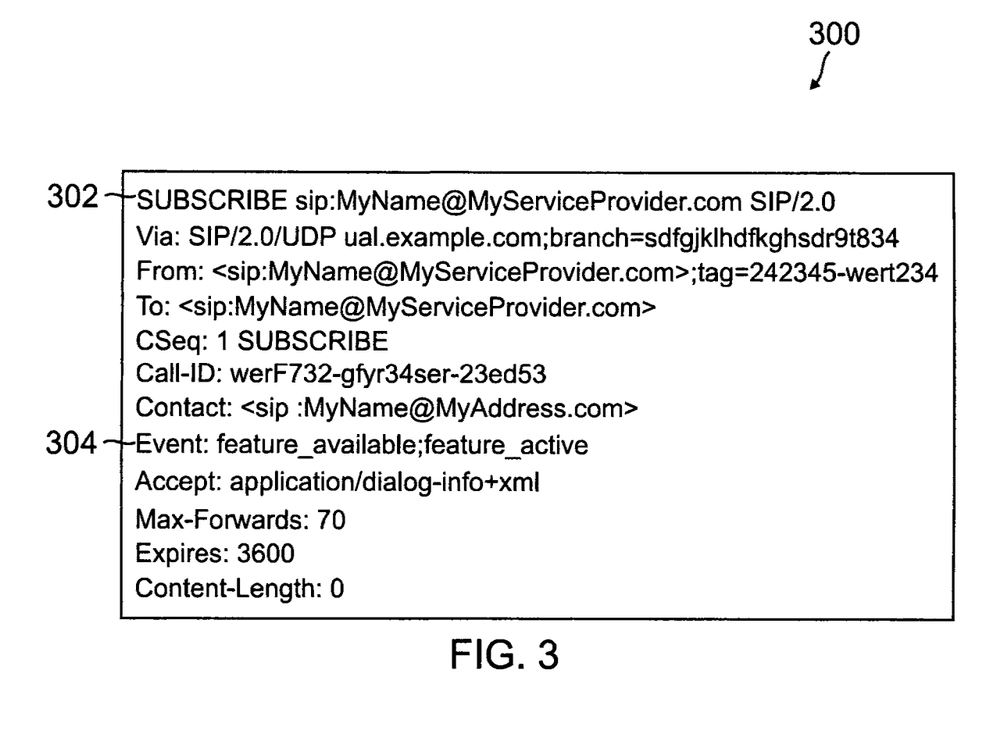
FIG. 3 is representative code depicting a subscribe message sent to a service provider in accordance with one aspect of the present application.

Upon successful registration, a subscribe message can be sent to the service provider 102 to subscribe for feature information services at block 206. In one embodiment, the communication device 110 is not required to register with the service provider 102. The subscribe message 300, as depicted in FIG. 3, can be provided as a message pattern and characterized into classes. Generally, the subscribe message 300 can be recognized by the service provider 102 through the SUBSCRIBE label 302. In one embodiment, the subscribe message 300 can indicate that the user of the communication device 110 intends to receive information about the status of a service provider session. For example, in the subscribe message 300, the code includes an EVENT label 304 filled with feature_available;feature_active.

After receiving the subscribe message 300, the service provider 102 can determine a set of available features for the communication device 110. The available features can be dependent on a number of factors including licensing, location, or subscription of the communication device 110. Other factors can include whether the communication device 110 is idle or active. In one example, available features would differ dependent on whether the user is on a call or not on a call. The service provider 102 can also interact with devices 112 and 114 on the LAN 108.

While represented as interacting with only one service provider 102, the communication device 110 can communicate with a number of service providers 102 as shown in FIG. 1. After determining the available features, the service provider 102 can send them to the communication device 110. At block 208, the communication device 110 can receive notification of the available features. FIG. 4 is representative code depicting available features for the communication device 110 provided by the service provider 102 in the form of a notification message 400 in accordance with one aspect of the present application.

The notification message 400 can provide the communication device 110 with available features, which were determined by the service provider 102 based on location, licensing, or other criteria. The message 400 provided by the service provider 102 can be indicated by the NOTIFY label 402. The notification message 400 can include an EVENT label 404 filled with feature_available;feature_active. In the body 406 of the notification message 400, the available features are between the <feature_available> label 408 and the </feature_available> label 410, in the shown embodiment. The provided features therebetween represent a small set of features possible. Known to those skilled in the relevant art, numerous other features can be implemented.

Each feature can be labeled with a <feature> label 412 and be closed with a </feature> label 414 within the body 406 of the notification message 400. Associated with the features are attributes that can include a <feature-id> </feature-id> pair 416, <feature-data> </feature-data> pair 418, <feature-label> </feature-label> pair 420, <feature-menu> </feature-menu> pair 422 and <feature-state> </feature-state> pair 424. The <feature-id> </feature-id> pair 416 is a unique identifier which represents the feature from the perspective of the service provider 102. When this identifier is sent to the service provider 102, the service provider 102 can interpret the intent of the communication device 110. The <feature-data> </feature-data> pair 418 can indicate whether the device needs to prompt the user for additional input if the feature is selected on the phone. In one embodiment, the values that can be provided between the <feature-data> </feature-data> pair 418 are 0 for false and 1 for true.

The <feature-label> </feature-label> pair 420 can include a text string that is populated into the communication device 110 menus. A <feature-menu> </feature-menu> pair 422 can indicate whether the feature can be used when the user is in a call or out of a call. When the pair 422 is set to idle, no call is required on the device to activate the feature. If the pair 422 is active, this implies that the device must be actively on a call for the feature to be activated. The <feature-state> </feature-state> pair 424 can be used to identify the current states of the feature with respect to the communication device 110.

While numerous attributes for each feature were shown, those skilled in the relevant art will appreciate that fewer or more attributes can be used. The language and identifiers within each of the pairs 416, 418, 420, 422 and 424 can be changed to fit the user's individual needs. Furthermore, the represented code shows one embodiment. Numerous other implementations of code can be used.

For purposes of illustration, each of the features provided within the body 406 of the notification message 400 will now be described in more details. The first <feature> </feature> pair 412 provides a Call Forward Always option. The <feature-id> </feature-id> pair 416 can have a CFA label indicating the Call Forward Always option. The <feature-data> </feature-data> pair 418 indicates a 1 meaning that additional data is required from the user. The additional data can include a phone number for forwarding a call. The <feature-label> </feature-label> pair 420 can provide a text string to be placed within a menu on the communication device 110. The <feature-menu> </feature-menu> pair 422 indicates idle such that no call is required on the communication device 110 to active the feature. The <feature-state> </feature-state> pair 424 indicates that the Call Forward Always option is off.

The second feature has a <feature-id> </feature-id> pair 416 with a label DND therebetween indicating a Do Not Disturb Option. The <feature-data></feature-data> pair 418 has a 0 indicating that no new additional data is required from the user. The <feature-label> </feature-label> pair 420 provides the text string to be displayed on a menu of the communication device 110. The <feature-menu> </feature-menu> pair 422 indicates idle such that no call is required on the communication device 110 to activate the feature. The <feature-state></feature-state> pair 424 indicates that the Do Not Disturb option is on.

The third feature within the body 406 of the notification message 400 has a <feature-id> </feature-id> pair 416 with a label CPrk therebetween indicating a Call Park option. The <feature-data> </feature-data> pair 418 indicates a 1 showing that additional input is required from the user. The <feature-label> </feature-label> pair 420 provides a text string to be shown within a menu on the communication device 110. The <feature-menu> </feature-menu> pair 422 indicates active such that a call is required on the communication device 110 to activate the feature. The <feature-state> </feature-state> pair 424 indicating that the Call Park option is off.

Continuing with the process of FIG. 2, at block 210, the communication device 110 can populate its menus with the information provided in the <feature-label> </feature-label> pair 420. The communication device 110 can provide some form of notification of the features that are already active against the device 110 to serve as a reminder to the user. At block 212, active features can be displayed on the communication device 110. At decision block 214, a determination can be made by the communication device 110 whether the user has selected a label to activate a feature. When no label selection occurs, the processes can end at block 228 of FIG. 2B.

If the user selects any label appearing in the list of actions that can be taken by the communication device 110 while idle or active, the device 110 determines if additional user input is required at decision block 216 of FIG. 2B. As shown above, this can be indicated by the <feature-data> </feature-data> pair 418 being 1. When no additional information is required, the processes can continue at block 220 described below. Otherwise, the communication device 110 receives additional information from the user at block 218. Using a Forward Always option as an example, the user can enter a number to which all calls will be forwarded. When the user completes the data entry, or if no data entry is required, a message is sent to the service provider 102 containing the feature identifier and any additional data at block 220.

The service provider 102 can then interpret the requested feature based on the feature identifier, and then user the additional data to apply the feature, if necessary. There is no need to standardize the feature identifiers, as they typically only have meaning between the device 110 and the service provider 102 that is providing the service. In one embodiment, some set or client vendors can provide some specialized handling of features, but this is not required and requires additional software to differentiate features. If the feature is successfully applied, a notification can be sent to the device 110 that the feature is now active, otherwise an error is returned. At decision block 222, a determination is made by the communication device 110 whether the feature was successfully implemented. When not, the communication device 110 displays an error at block 226 and proceeds to block 228. Otherwise, the communication device 110 displays that the feature was successfully applied at block 224. The processed can end at block 228.

In one embodiment, the system 100 can allow automatic population of feature capabilities available to the communication device 110 from the service provider 102 in any language with a name that reflects something meaningful to the user. For example, some users can prefer the term link or join instead of conference, depending on the geographical region. The system 100 can offer complete customization per user, region, and provider.

Depending on the service provider 102 that the phone is connected to, the menus can be augmented on the fly with new capabilities which can be offered free of charge, pay per use, or subscriber based. The menus can be updated at any time from the service provider 102, which further allows for state sensitive options to be provided. For example, when two calls are present, the in-call menu can provide swap and conference options, which do not have to exist when a single call is active. By offering the features from the service provider 102, instead of the communication device 110 itself, more service aware interactions can occur.

While SIP has been used to illustrate the signaling exchange, an open standard protocol is not mandatory. As long as the communication device 110 has a menu that can be populated with feature options, the ability to select the feature, and then report it to the service provider 102, the system 100 described herein can be used. The primary intent is to allow a single device 110 to support features from many providers 102 dynamically. For example, an Android™ application can be created which can talk to a service provider 102 using a proprietary protocol, obtain the list of services available, and then the Android service app would update the call menus of the Android phone app.

In one embodiment, the system 100 can be altered to deliver any dynamic content to a communications device 110 based on the service provider 102 it is obtaining service from. The content can be updated regularly based on subscription, licensing, geographic availability, or other reasons as decided upon by the service provider 102. The system 100 can also be used to report features that remain active on a device 110. For example, if Do Not Disturb or Call Forward Always is enabled at the service provider 102 and not the device 110 itself, the next time the communication device 110 registers for service from the provider 102, the device 110 can be notified of the features available and then further told which features are already active on the device 110. Consequently, this maps more directly to a PBX style environment, where features are executed on the PBX, not the device. It also allows for devices to be shared among users since the feature remains tied to the user account and not the device 110.

The system 100 can also be useful to most client server models, wherein the client and server are independent. As an example, a voice mail system can be considered. Upon connection, the voicemail system can send the feature identifications required to play, delete, or skip a message. The communication device 110 can then present the in-call options of play, delete, and skip while connected to voicemail. From the user's perspective, they never have to remember the different keys to press for PBX voice mail, compared to their cellular voice mail, compared to their home voice mail. Because home, cellular, cable, and business voice mails can be provided by different service providers 102, the voice mail interfaces can differ, which causes end user confusion. The system 100 described herein can be adapted to voice mail, effectively abstracting the key press overhead and industry differences from the user, and presenting a consistent model.

In accordance with one aspect of the present application, a method for populating feature capabilities on a communication device is provided. The method can include registering with a service provider, receiving notification of at least one available feature from the service provider and displaying the at least one available feature. In addition, the method can include receiving a selection for a feature from the at least one available feature. The method can also include providing the selection to the service provider to apply to the feature.

In one embodiment, the method can include receiving a notification from the service provider that the selection has been applied to the feature. In one embodiment, the method can include receiving a notification from the service provider that the selection has not been applied to the feature. In one embodiment, providing the selection to the service provider can include additional input for applying the feature. In one embodiment, the additional input can be a number for forwarding calls.

In one embodiment, the at least one available feature can be determined by the service provider based a location or license of the communication device. In one embodiment, the at least one available feature can be dependent on whether the communication device is in or out of a call. In one embodiment, the at least one available feature can include at least one of transfer, swap, new call, hold, call park and record call when the communication device is in the call. In one embodiment, the at least one available feature can include at least one of contacts, speed dial, call forward, call pickup, and do not disturb when the communication device is out of the call.

In accordance with another aspect of the present application, a system is provided. The system can include a mobile device having features supported by at least one service provider. The mobile device can display a menu with the features. The mobile device can receive an action request for a feature within the displayed features and transmit the action request to the at least one service provider whereat the action request for the feature is applied.

In one embodiment, the features can be provided through an open standard protocol. In one embodiment, the features can include at least one of call forwarding, do not disturb, and call park. In one embodiment, the call forwarding can include at least one of always, never, or sometimes. In one embodiment, the call forwarding can include receiving an additional number.

In one embodiment, the menu can include text strings that are provided by the at least one service provider. In one embodiment, the features are dependent on whether the mobile phone is idle or active.

In accordance with yet another aspect of the present application, a service provider is provided. The service provider can include at least one processor and a memory operatively coupled to the processor, the memory storing program instructions that when executed by the processor, causes the processor to perform processes. The process can include registering a computing device. In addition, the processes can include providing notification of available features to the computing device. The processes can also include receiving a feature request associated with the available features and applying the feature request.

In one embodiment, the memory storing program instructions, when executed by the processor, causes the processor to register the computing device using registration information received by the computing device and send confirmation to the computing device whether the computing device was successfully registered. In one embodiment, the memory storing program instructions, when executed by the processor, causes the processor to determine the available features based on location or licensing of the computing device. In one embodiment, the memory storing program instructions, when executed by the processor, causes the processor to apply the feature request with additional data received by the computing device.

The foregoing description is provided to enable any person skilled in the relevant art to practice the various embodiments described herein. Various modifications to these embodiments will be readily apparent to those skilled in the relevant art, and generic principles defined herein can be applied to other embodiments. Thus, the claims are not intended to be limited to the embodiments shown and described herein, but are to be accorded the full scope consistent with the language of the claims, wherein reference to an element in the singular is not intended to mean "one and only one" unless specifically stated, but rather "one or more." All structural and functional equivalents to the elements of the various embodiments described throughout this disclosure that are known or later come to be known to those of ordinary skill in the relevant art are expressly incorporated herein by reference and intended to be encompassed by the claims. Moreover, nothing disclosed herein is intended to be dedicated to the public regardless of whether such disclosure is explicitly recited in the claims.

What is claimed is:

1. On a communication device, a method for populating feature capabilities comprising:
    registering with a service provider;
    receiving, from said service provider, notification of at least one available feature and corresponding data items comprising an identifier, a label, and a current status, said current status indicating whether said at least one feature is active on said communication device;
    populating a menu on said communication device wherein said menu comprises said label and said current status and is limited to said at least one available feature;
    displaying said menu;
    receiving a selection for a feature from said menu;
    providing said identifier corresponding to said selected feature to said service provider to activate or de-activate said feature based on said identifier;
    upon said activating or de-activating of said selected feature, updating said menu comprising updating said current status; and
    displaying said updated menu.

2. The method of claim 1, further comprising receiving a notification from said service provider that said selection has been applied to said feature.

3. The method of claim 1, further comprising receiving a notification from said service provider that said selection has not been applied to said feature.

4. The method of claim 1, wherein providing said selection to said service provider comprises additional input for applying said feature.

5. The method of claim 4, wherein said additional input is a number for forwarding calls.

6. The method of claim 1, wherein said at least one available feature is determined by said service provider based a location or license of said communication device.

7. The method of claim 1, wherein said at least one available feature is dependent on whether said communication device is in or out of a call.

8. The method of claim 7, wherein said at least one available feature comprises at least one of transfer, swap, new call, hold, call park and record call when said communication device is in said call.

9. The method of claim 7, wherein said at least one available feature comprises at least one of contacts, speed dial, call forward, call pickup, and do not disturb when said communication device is out of said call.

10. A system comprising:
a mobile device having features supported by at least one service provider;
wherein said mobile device receives, from said at least one service provider, notification of said features and corresponding data items comprising an identifier, a label, and a current status, said current status indicating whether said features are active on said mobile device and populates a menu on said mobile device wherein said menu comprises said label and said current status and is limited to said supported features, displays said menu wherein said menu is limited to said supported features, said mobile device receiving an action request for a feature from said menu and transmitting said action request comprising a identifier corresponding to said selected feature to said at least one service provider whereat said action request for said selected feature is activated or de-activated based on said identifier.

11. The system of claim 10, wherein said features are provided through an open standard protocol.

12. The system of claim 10, wherein said features comprise at least one of call forwarding, do not disturb, and call park.

13. The system of claim 12, wherein said call forwarding comprises at least one of always, never, or sometimes.

14. The system of claim 12, wherein said call forwarding comprises receiving an additional number.

15. The system of claim 10, wherein said menu comprises text strings that are provided by said at least one service provider.

16. The system of claim 10, wherein said features are dependent on whether the mobile phone is idle or active.

17. A service provider comprising:
at least one processor; and
a memory operatively coupled to said processor, said memory storing program instructions that when executed by said processor, causes said processor to:
register a computing device;
provide notification of available features and corresponding data items comprising an identifier, a label and a current status, said current status indicating whether said at least one feature is active on said computing device to said computing device for populating a menu on said communication device wherein said menu comprises said label and said current status and is limited to said available features;
receive a feature request associated with said available features, said feature request comprising a unique identifier corresponding to one of said available features;
apply said feature request based on said identifier to activate or de-activate said feature based on said unique identifier.

18. The service provider of claim 17, wherein said memory storing program instructions, when executed by said processor, causes said processor to register said computing device using registration information received by said computing device and send confirmation to said computing device whether said computing device was successfully registered.

19. The service provider of claim 17, wherein said memory storing program instructions, when executed by said processor, causes said processor to determine said available features based on location or licensing of said computing device.

20. The service provider of claim 17, wherein said memory storing program instructions, when executed by said processor, causes said processor to apply said feature request with additional data received by said computing device.

* * * * *